United States Patent
Kim (10) Patent No.: US 8,736,602 B2
(45) Date of Patent: May 27, 2014

(54) DISPLAY APPARATUS AND CONTROL METHOD THEREOF

(75) Inventor: Yeong-seok Kim, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 650 days.

(21) Appl. No.: 12/970,363

(22) Filed: Dec. 16, 2010

(65) Prior Publication Data

US 2012/0068997 A1   Mar. 22, 2012

(30) Foreign Application Priority Data

Sep. 17, 2010   (KR) .................. 10-2010-0091371

(51) Int. Cl.
*G06T 15/00* (2011.01)
(52) U.S. Cl.
USPC .......................................... 345/419; 345/422
(58) Field of Classification Search
USPC ............................................... 345/419, 422
See application file for complete search history.

(56) References Cited

U.S. PATENT DOCUMENTS

2002/0163482 A1* 11/2002 Sullivan ..................... 345/419
2009/0146914 A1*  6/2009 Seong et al. ................ 345/419

FOREIGN PATENT DOCUMENTS

JP    2006-107170 A     4/2006
WO   WO 2008013352 A1 * 1/2008

* cited by examiner

*Primary Examiner* — Maurice L McDowell, Jr.
(74) *Attorney, Agent, or Firm* — Sughrue Mion, PLLC (57) ABSTRACT

A display apparatus and method of controlling the display apparatus are provided herein. The display apparatus includes: a display unit; an image receiving unit which receives an image signal from an image source; and an image processing unit which processes the image signal, controls the display unit to display a three-dimensional (3D) image based on the processed image signal, controls the display unit to display a plurality of selectable sub-images which are respectively based on different preset 3D information values, and corrects the 3D image displayed on the display unit based on a 3D information value of a selected sub-image.

17 Claims, 8 Drawing Sheets

DISPLAY APPARATUS AND CONTROL METHOD THEREOF

CROSS-REFERENCE TO RELATED APPLICATION

This application claims priority from Korean Patent Application No. 10-2010-0091371, filed on Sep. 17, 2010 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus with an improved structure which reflects a value of 3D information desired by a user in a 3D image, and a control method thereof.

2. Description of the Related Art

A display apparatus processes an image signal input from an external image source and displays an image on a display panel, which is implemented by a liquid crystal display or the like, based on the processed image signal. The display apparatus scans the display panel with scan lines including image information for display of the image and constructs one image field or frame by arranging the scan lines on the display panel in a sequence.

An image displayed by the display apparatus may be classified into a two-dimensional (2D) image and a three-dimensional (3D) image depending on its properties. Viewing angles for respective eyes of a user are different, which allows the user to perceive a 3D image of an object. According to this principle, the 3D image is displayed with it being divided into a left eye image field and a right eye image field, whereby the user views the left eye image field and the right eye image field, which are displayed in a time-alternating manner and overlap with each other. In this case, a depth of the object in the 3D image perceived by the user is determined based on a relative positional relationship between the left eye image field and the right eye image field and may be differently perceived depending on who views the image. Therefore, it is desirable to easily adjust the depth of the object when the display apparatus displays the 3D image.

SUMMARY

An aspect of the present invention provides a display apparatus which may include: a display unit; an image receiving unit which receives an image signal from an image source; and an image processing unit which processes the image signal, controls the display unit to display a three-dimensional (3D) image based on the processed image signal, controls the display unit to display a plurality of selectable sub-images which are respectively based on different preset 3D information values, and corrects the 3D image displayed on the display unit based on a 3D information value of a selected sub-image.

The 3D information value may include a depth value of the 3D image.

The image processing unit may extract a reference image for the plurality of selectable sub-images from the 3D image.

The image processing unit may control the display unit to stop displaying the 3D image if sending of the image signal from the image source can be stopped, and extracts the reference image from the stopped 3D image.

The image processing unit may extract a still image from the 3D image if sending of the image signal from the image source cannot be stopped, and extract the reference image from the extracted still image.

The plurality of selectable sub-images may be provided separately from the image signal.

The image processing unit may divide a region of the display into sub-regions and arrange the plurality of selectable sub-images respectively on the sub-regions.

The image processing unit may arrange the plurality of selectable sub-images on a plurality of respective sub-areas in a region of the display and apply different 3D information values respectively to the respective sub-areas of the selected sub-image.

The display apparatus may further include a user input unit which is operable to control the image processing unit.

Another aspect of the present invention provides a a method of controlling a display apparatus having a display unit, wherein the method may include: displaying on the display unit a three-dimensional (3D) image based on an image signal received from an image source; displaying on the display unit a plurality of selectable sub-images which are respectively based on different preset 3D information values; and correcting the displayed 3D image based on a 3D information value of a selected sub-image.

The 3D information value may include a depth value of the 3D image.

The displaying of the plurality of selectable sub-images may include extracting a reference image for the plurality of selectable sub-images from the 3D image.

The displaying of the plurality of selectable sub-images may include stopping displaying of the 3D image if sending of the image signal from the image source can be stopped, and extracting the reference image from the stopped 3D image.

The displaying of the plurality of selectable sub-images may include extracting a still image from the 3D image if sending of the image signal from the image source cannot be stopped, and extracting the reference image from the extracted still image.

The plurality of selectable sub-images may be provided separately from the image signal.

The displaying of the plurality of selectable sub-images may include dividing a region of the display unit into sub-regions and arranging the plurality of selectable sub-images on respective sub-regions.

The displaying of the plurality of selectable sub-images may include arranging the plurality of selectable sub-images on a plurality of respective sub-areas in a region of the display unit and applying different 3D information values respectively to the respective sub-areas of the selected sub-image.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. In the following exemplary embodiments, explanation of components having no direct relation to the spirit of the present invention is omitted. However, it is appreciated that it is not meant to exclude such omitted components from a display system 1 to which the spirit of the invention may be applied.

Figure 1:
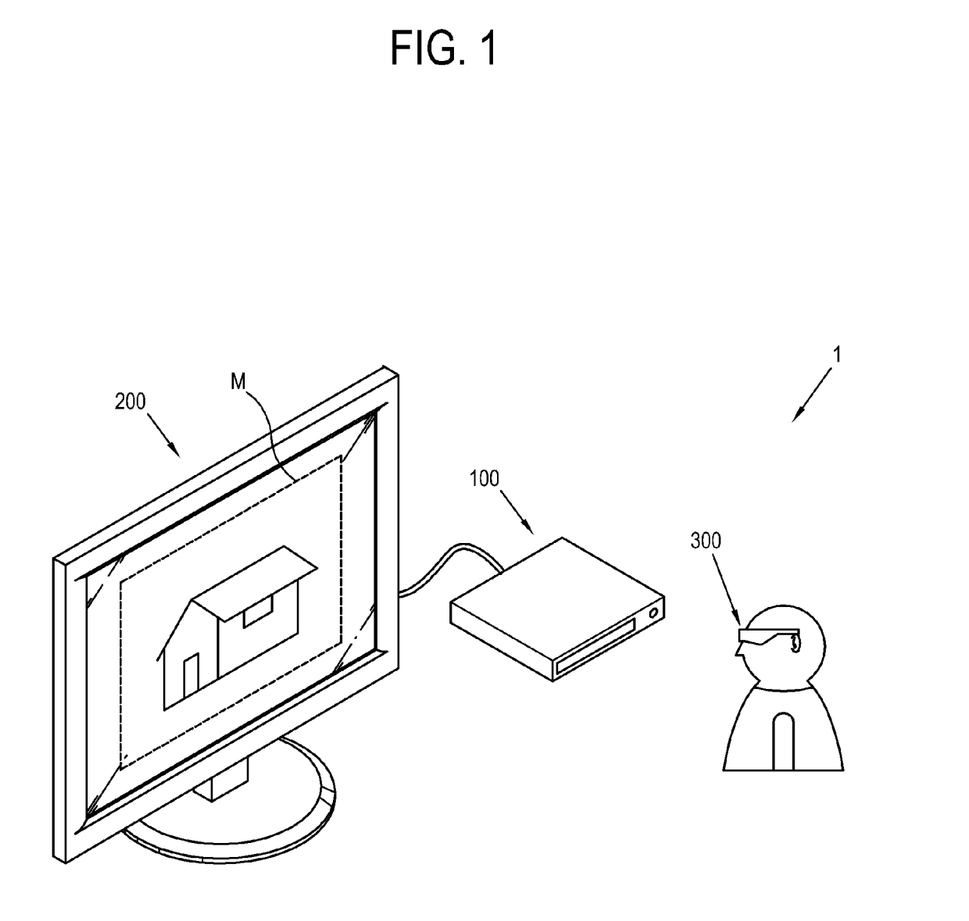
FIG. 1 is a view showing an example of a display system according an exemplary embodiment of the present invention.

FIG. 1 is a view showing an example of a display system 1 according an exemplary embodiment of the present invention.

Referring to FIG. 1, the display system 1 according to this exemplary embodiment includes an image source 100 which provides an image signal, a display apparatus 200 which processes the image signal input from the image source 100 and displays an image based on the processed image signal, and shutter glasses 300 operable to selectively transmit/shield light in response to an image being displayed as a 3D image (M) on the display apparatus 200.

The image source 100 generates the image signal and outputs it to the display apparatus 200. The image source 100 may be implemented by various ways including, but is not limited to, a computer (not shown) which generates an image signal with a central processing unit (CPU) (not shown) and a graphic card (not shown) and provides it locally, a server (not shown) which provides an image signal to a network, a broadcasting apparatus (not shown) of a broadcasting station which broadcasts a broadcasting signal via the air or a cable, or others known in the art.

The display apparatus 200 receives a 2D image signal corresponding to a 2D image or a 3D image signal corresponding to a 3D image from the image source 100 and processes it for image displaying. In this case, the 3D image (M) includes a left eye image field corresponding to a left eye of a user and a right eye image field corresponding to a right eye of the user, unlike the 2D image. Upon receiving the 3D image signal, the display apparatus 200 displays the left eye image field and the right eye image field alternately based on the received 3D image signal.

When the 3D image (M) is displayed on the display apparatus 200, the shutter glasses 300 selectively opens/closes a field of view for the left and right eyes of the user depending on which is being currently displayed, the left eye image field or the right eye image field. For example, if the left eye image field is being displayed on the display apparatus 200, the shutter glasses 30 opens the field of view for the left eye of the user and closes the field of view for the right eye. Conversely, if the right eye image field is being displayed on the display apparatus 200, the shutter glasses 30 opens the field of view for the right eye and closes the field of view for the left eye.

Although it is illustrated in this exemplary embodiment that the image source 100 is locally connected to the display apparatus 200 and the display system 1 includes the shutter glasses 300, this is merely one example. For example, the image source 100 may be implemented by broadcasting signal transmission equipment (not shown) of a broadcasting station or a server (not shown) which accesses the display apparatus 200 via a wired/wireless network. In addition, the display system 1 may be provided with 3D glasses such as polarizer glasses or the like, instead of the shutter glasses 300, or may not be provided with any 3D glasses.

Figure 2:
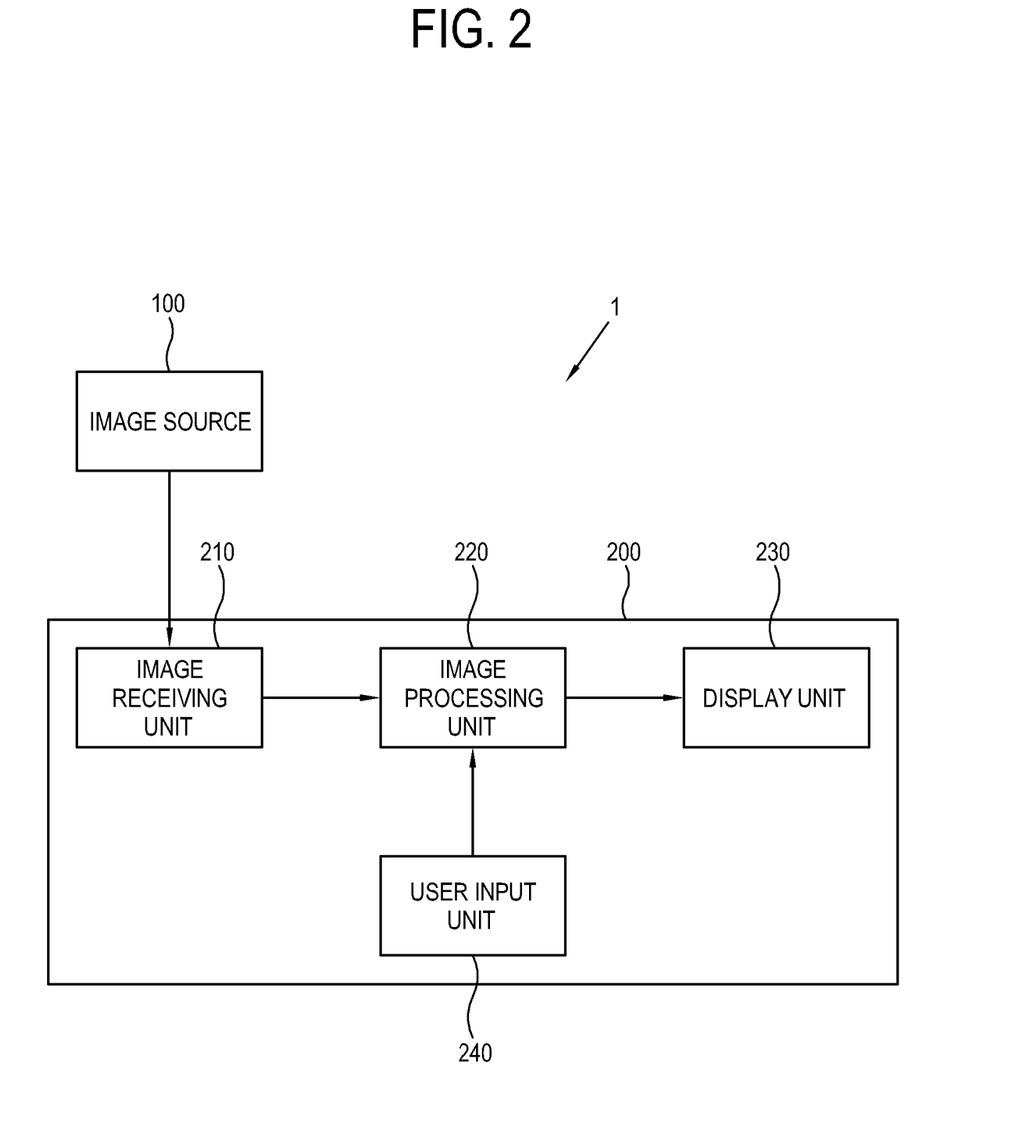
FIG. 2 is a block diagram of a display apparatus according an exemplary embodiment of the present invention.

Hereinafter, a configuration of the display apparatus will be described in more detail with reference to FIG. 2. FIG. 2 is a block diagram of the display apparatus 200.

Referring to FIG. 2, the display apparatus 200 includes an image receiving unit 210 which receives an image signal from the image source 100, an image processing unit 220 which processes the image signal received by the image receiving unit 210, a display unit 230 which displays an image based on the image signal processed by the image processing unit 220, and a user input unit 240 which is operable by a user to transfer a preset control signal to the image processing unit 220.

The image receiving unit 210 receives the image signal and transfers it to the image processing unit 220. The image receiving unit 210 may be implemented in various ways according to the standards of the received image signal and the form of implementation of the display apparatus 200.

For example, if the display apparatus 200 is implemented by a TV, the image receiving unit 210 may receive a radio frequency (RF) signal such as a broadcasting signal sent from a broadcasting station (not shown) by wireless or receive an image signal via a cable, which is according to the standards of composite video, component video, super video, SCART, high definition multimedia interface (HDMI) or others known in the art. If the image signal is the broadcasting signal, the image receiving unit 210 includes a tuner which tunes the broadcasting signal for each channel.

If the display apparatus 200 is a computer monitor, the image receiving unit 210 may be implemented with D-SUB to facilitate transfer of a VGA-based RGB signal, DVI-A (analog), DVI-I (integrated digital/analog) or DVI-D (digital) according to the DVI (digital video interactive) standards, or the HDMI standards. Alternatively, the image receiving unit 110 may be also implemented by DisplayPort, UDI (unified display interface) or wireless HD specification.

The image processing unit 220 performs various image processing preset for the image signal. The image processing unit 220 outputs the processed image signal to the display unit 230, so that an image can be displayed on a display region of the display unit 230.

The image processing performed by the image processing unit 220 may include, but is not limited to, decoding and encoding, de-interlacing, frame refresh rate conversion, scaling, noise reduction for improved image quality and detail enhancement in association with various image formats. The image processing unit 220 may be implemented with individual configuration to allow independent performance of these processes or with integrated configuration of these processes.

The display unit 230 has a display region on which an image is displayed based on the image signal processed and output by the image processing unit 220. As used herein, the term "display region" refers to a region on the display unit 230 on which an image is displayed. To this end, in this exemplary embodiment, the display unit 230 may be implemented in various ways including, but is not limited to, a liquid crystal display panel (not shown).

The user input unit 240 is operable by a user to output various preset control signals to the image processing unit 220. Upon receiving any control signals from the user input unit 240, the image processing unit 220 performs processes associated with the control signals. The user input unit 240 may be implemented in various ways including, but is not limited to, menu keys placed in the outside of the display apparatus 200, or a remote controller.

Figure 3:
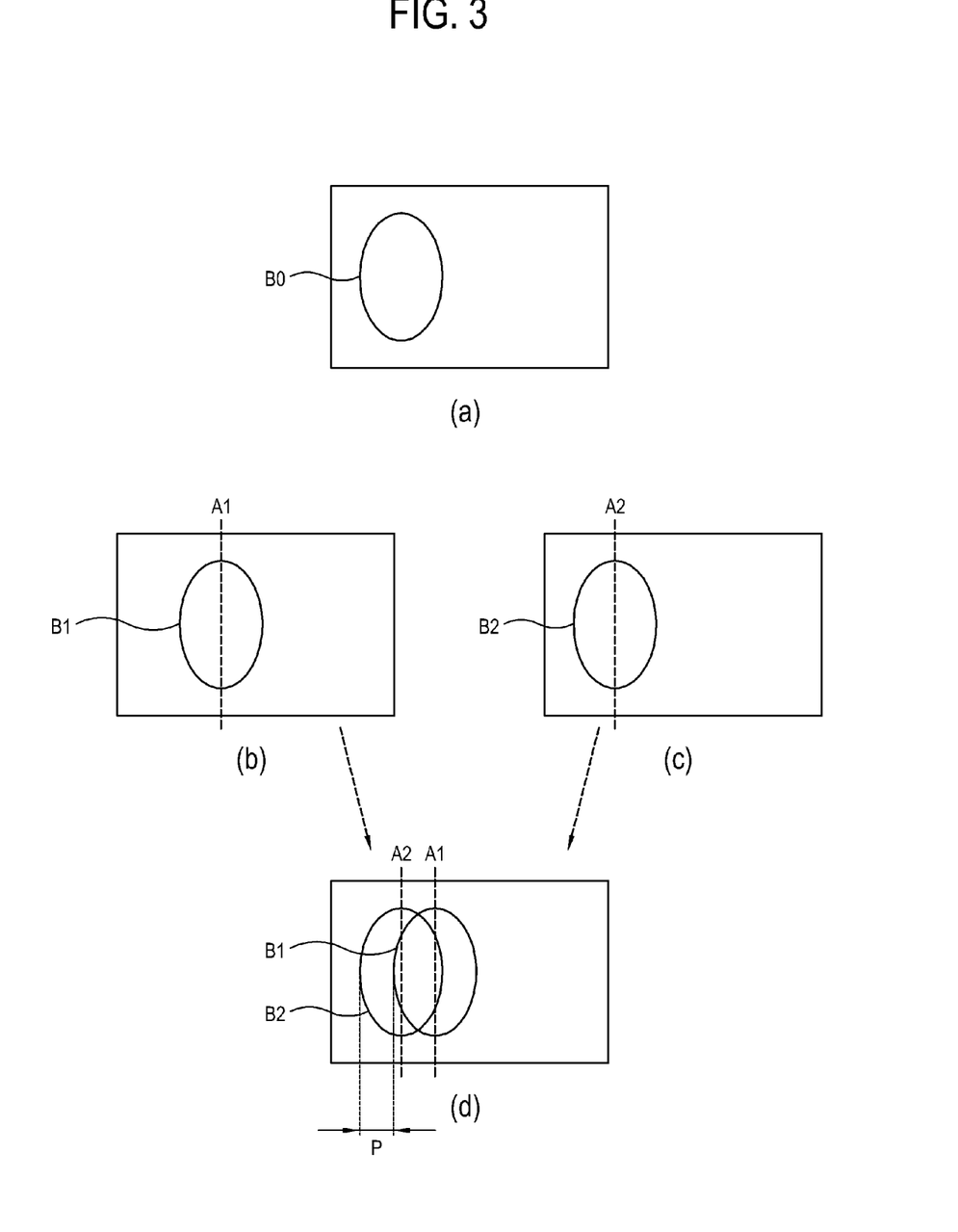
FIG. 3 is a view showing how left and right image fields may be used to form a 3D image in a display apparatus according an exemplary embodiment of the present invention.

With the above configuration, when a 3D image signal is received by the image receiving unit 210, the image processing unit 220 processes the received image signal so that a 3D image can be displayed on the display unit 230. Hereinafter, a detailed configuration for display of the 3D image will be described with reference to FIG. 3. FIG. 3 is a view showing how left and right image fields configure a 3D image. It is noted in this figure that dimensions including size, distance and the like may be exaggerated for more clarity of this exemplary embodiment.

FIG. 3(a) shows an example 3D image. The shown 3D image may include various unlimited objects B0. Each object B0 is displayed with preset 3D information reflected therein, so that a user can perceive the object B0 as a solid in the 3D image.

As used herein, the term "object B0" may refer to a pixel region to be perceived in a three dimension when a difference between left and right viewing angles of a user is applied in the 3D image, but being not limited thereto. In this exemplary embodiment, a single simple object B0 is shown in the 3D image for simplicity of description.

To allow the user to perceive the object B0 as a solid, the object B0 has to appear as if it has a depth in the 3D image, and thus 3D information reflected in the object B0 includes a value of depth of the 3D image. As used herein, the term "depth of the object B0" refers to a relative distance of the object B0 perceived by the user, which indicates whether the object B0 is close to or far from the user.

The image processing unit 220 causes the object B0 to be displayed in a three dimension according to the following method.

FIGS. 3(b) and 3(c) show a left eye image field and a right eye image field of the 3D image shown in FIG. 3(a), respectively. The left eye image field and the right eye image field include respective objects B1 and B2 which have the same shape as, but different in arrangement from, the object B0 shown in FIG. 3(a).

For example, assuming that a center line of the object B1 in the left eye image field is A1 and a center line of the object B2 in the right eye image field is A2, A1 and A2 do not coincide when the left eye image field and the right eye image field overlap with each other, as shown in FIG. 3(d).

FIG. 3(d) shows an example of overlap of the left eye image field and the right eye image field in the display region. The image processing unit 220 causes the left eye image field and the right eye image field to be displayed sequentially, while the user perceives the left eye image field and the right eye image field to overlap with each other.

At this time, the object B1 of the left eye image field does not overlap with the object B2 of the right eye image field such that they coincide, producing a difference by a pixel value P between the objects B1 and B2. Such a difference by the pixel value P allows the user to perceive the object B0 as a solid having a depth in the 3D image.

Here, the object B0 depth perceived by the user depends on a value of 3D information reflected in the object B0 as mentioned earlier, for example, a value of depth of the 3D image. Accordingly, the image processing unit 220 may correct the displayed 3D image by changing and applying the value of 3D information to the object B0.

However, it is not easy for the user to determine and input a value of 3D information for himself/herself. Therefore, in this exemplary embodiment, the image processing unit 220 causes a plurality of sub-images reflecting different values of 3D image to be displayed on the display region in such a manner that the user can select a desired one of the displayed sub-images, and corrects the 3D image based on a value of 3D information on the selected sub-image. This allows the user to select a desired value of 3D information easily.

In this exemplary embodiment, in producing the sub-images, the image processing unit 220 may extract a reference image for the sub-images, i.e., an object reflecting different values of 3D information with respect to the respective eye image fields, from the 3D image displayed on the display unit 230.

When the reference image for the sub-images is extracted from the 3D image in this manner, the user may stop or not stop sending an image signal from the image source 100 at random.

For example, the user may stop sending an image signal from the image source 100 at random if the image source 100 is implemented by a DVD/Blue-ray player or the like connected locally to the display apparatus 200. In this case, the image processing unit 220 stops sending the image signal from the image source 100 and displaying the 3D image on the display unit 230, and then extracts a reference image for the sub-images from the stopped 3D image.

On the other hand, the user may not be able to stop sending an image signal from the image source 100 at random if the image source 100 is implemented by signal transmission equipment of a broadcasting station, a server or the like. In this case, the image processing unit 220 may extract a still image of the 3D image displayed on the display unit 230 and then extract a reference image for the sub-images from the extracted still image.

In addition, the image processing unit 220 may call and display a sub-image provided in advance separately from the 3D image without extracting a reference image for the sub-images from the 3D image. This may be altered in design, depending on the display apparatus 200.

Hereinafter, an example where the image processing unit 220 causes a plurality of sub-images to be displayed on the display region will be described with reference to FIGS. 4 to 6.

Figure 4:
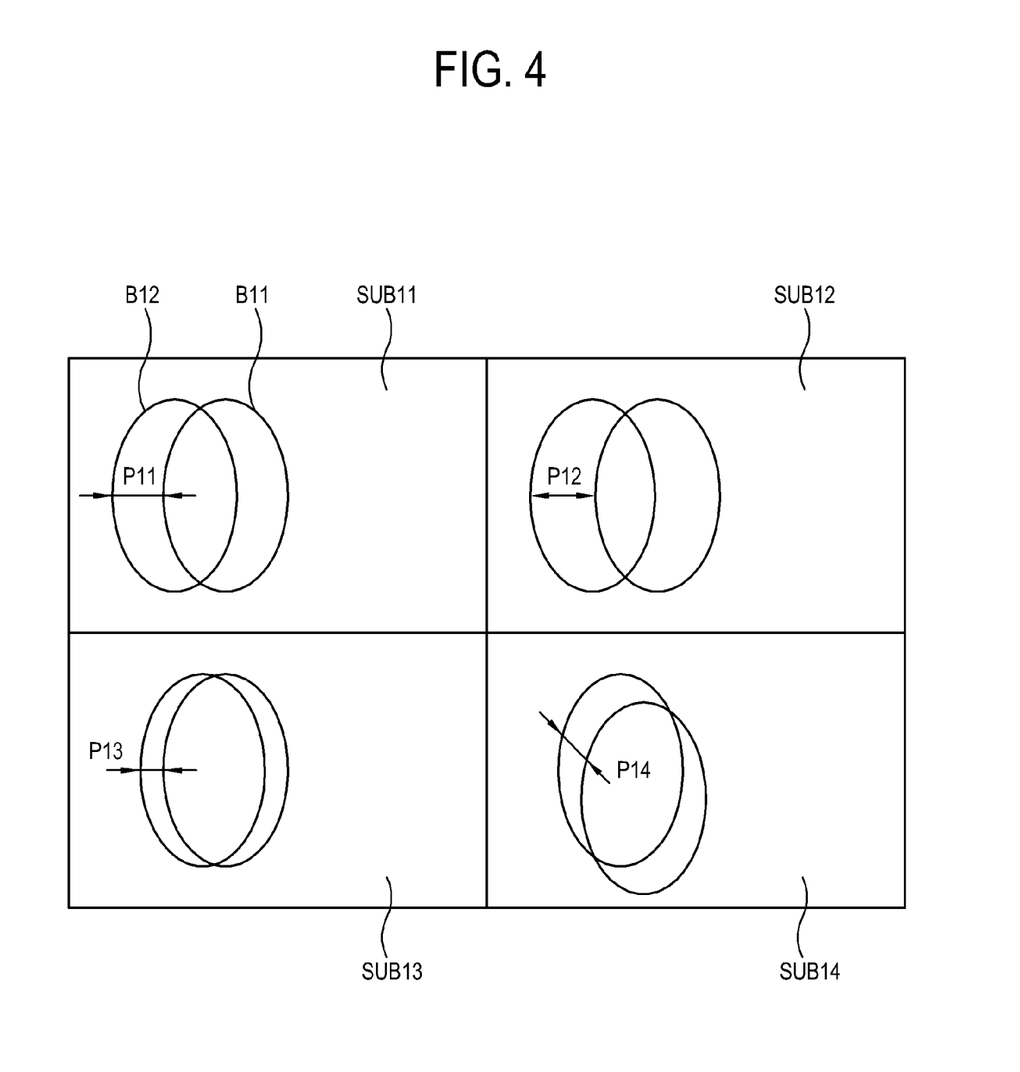
FIG. 4 is a view showing an example of sub-images displayed on a display region divided into 4 sub-regions.

FIG. 4 is a view showing an example of sub-images SUB11, SUB12, SUB13 and SUB14 displayed on the display region divided into 4 sub-regions.

If a preset event for display of sub-images SUB11, SUB12, SUB13 and SUB14 is generated by the user input unit 240, the image processing unit 220 divides the display region into a preset number of sub-regions. For example, the image processing unit 220 divides the display region into four sub-regions and displays the sub-images SUB11, SUB12, SUB13 and SUB14 reflecting respective different preset values of 3D information on the respective sub-regions SUB11, SUB12, SUB13 and SUB14.

In this exemplary embodiment, one sub-image SUB11, SUB12, SUB13 or SUB14 is displayed in such a manner that a reference image B11 corresponding to the left eye image field overlaps with a reference image B12 corresponding to the right eye image field, and differences P11, P12, P13 and P14 between the reference images B11 and B12 are differently set for each sub-images SUB11, SUB12, SUB13 and SUB14. In this exemplary embodiment, the differences P11, P12, P13 and P14 may be set in advance in the form of a table or may be derived by a preset algorithm.

In the meantime, the reference images B11 and B12 in the sub-images SUB11, SUB12 and SUB13 have a parallel orientation in which they overlap with each other, whereas the reference images B11 and B12 in the sub-image SUB14 have an orientation inclined at a predetermined angle. However, again, this is merely one example. The orientation in which the reference images B11 and B12 in one sub-image SUB11, SUB12, SUB13 or SUB14 overlap with each other may be provided with the same for all sub-images SUB11, SUB12, SUB13 and SUB14 or provided differently to at least one of the sub-images SUB11, SUB12, SUB13 and SUB14.

A minute visual difference may appear due to a horizontal unbalance between the left and right eye image fields of the image signal output from the image source 100. In this event, such a horizontal unbalance between the left and right eye image fields may be adjusted by applying the inclined orientation such as in the sub-image SUB14.

A user selects one of the plurality of sub-images SUB11, SUB12, SUB13 and SUB14 displayed in this manner through the user input unit 240. For example, if the sub-image SUB12 is selected, the image processing unit displays the sub-image SUB12 by applying the 3D information value P12 of the sub-image SUB12 to each object of the 3D image. In this manner, the image processing unit 220 corrects and displays the 3D image by reflecting the 3D information value of the selected sub-image SUB11, SUB12, SUB13 or SUB14.

If none of the sub-images SUB11, SUB12, SUB13 and SUB14 are desired, the user may generate an event for re-processing through the user input unit 240. When the re-processing event is generated, the image processing unit 220 displays a sub-image to which a 3D information value different from those of the displayed sub-images SUB11, SUB12, SUB13 and SUB14 is applied, on the display region.

In this manner, displaying the plurality of selectable sub-images SUB11, SUB12, SUB13 and SUB14 reflecting the respective different preset 3D information values on the display region allows the user to select a desired 3D information value and allows a 3D image reflecting the selected 3D information value to be displayed.

Figure 5:
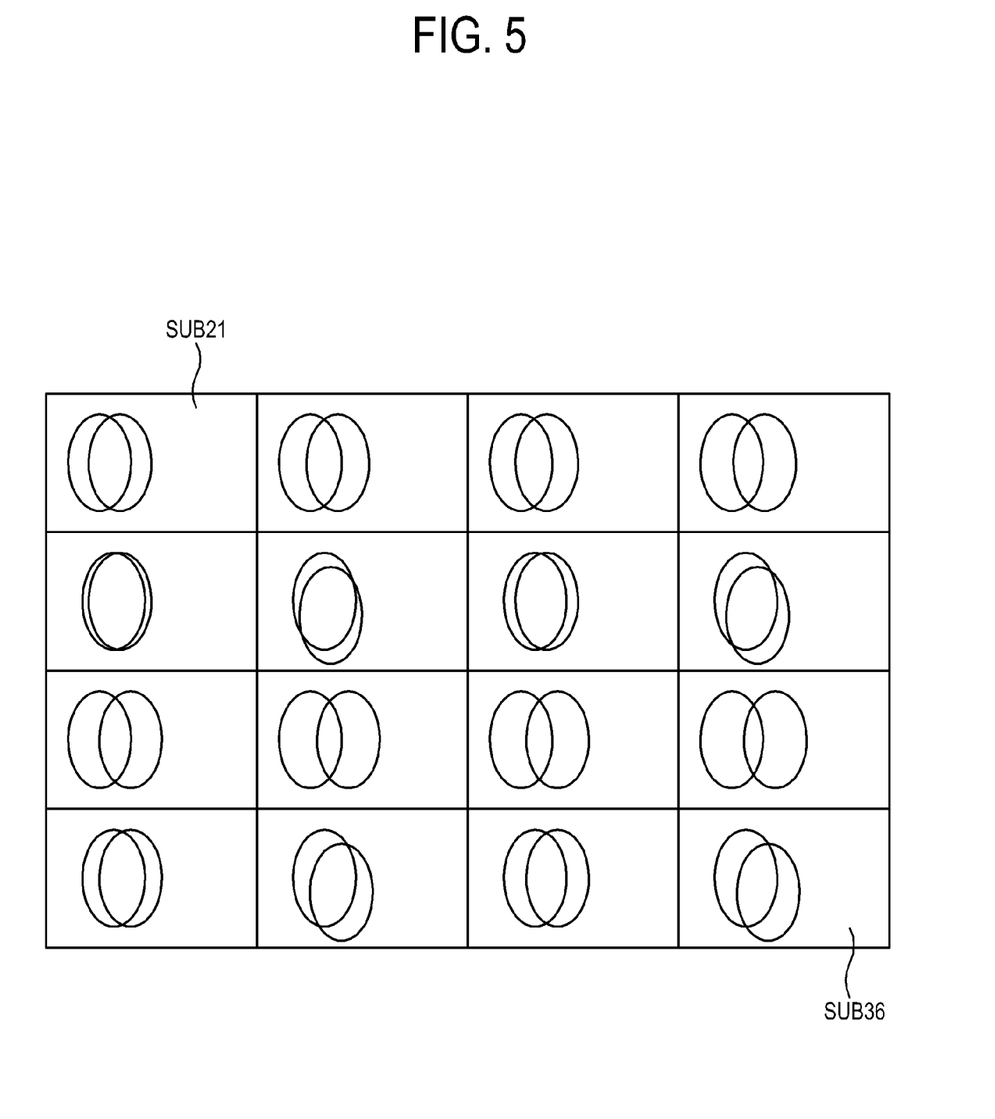
FIG. 5 is a view showing sub-images displayed on a display region divided into 16 sub-regions.

FIG. 5 is a view showing an example of sub images displayed on the display region divided into 16 sub-regions.

Referring to FIG. 5, the image processing unit 220 divides the display region into 16 sub-regions and arranges sub-images SUB21 to SUB36 on respective sub-regions. The image processing unit 220 may divide the display region and the number of sub-images SUB21 to SUB36 in various manners.

While FIGS. 4 and 5 show examples where the image processing unit 220 arranges a plurality of sub-images individually on respective sub-regions, the spirit of the present invention is not limited thereto.

Figure 6:
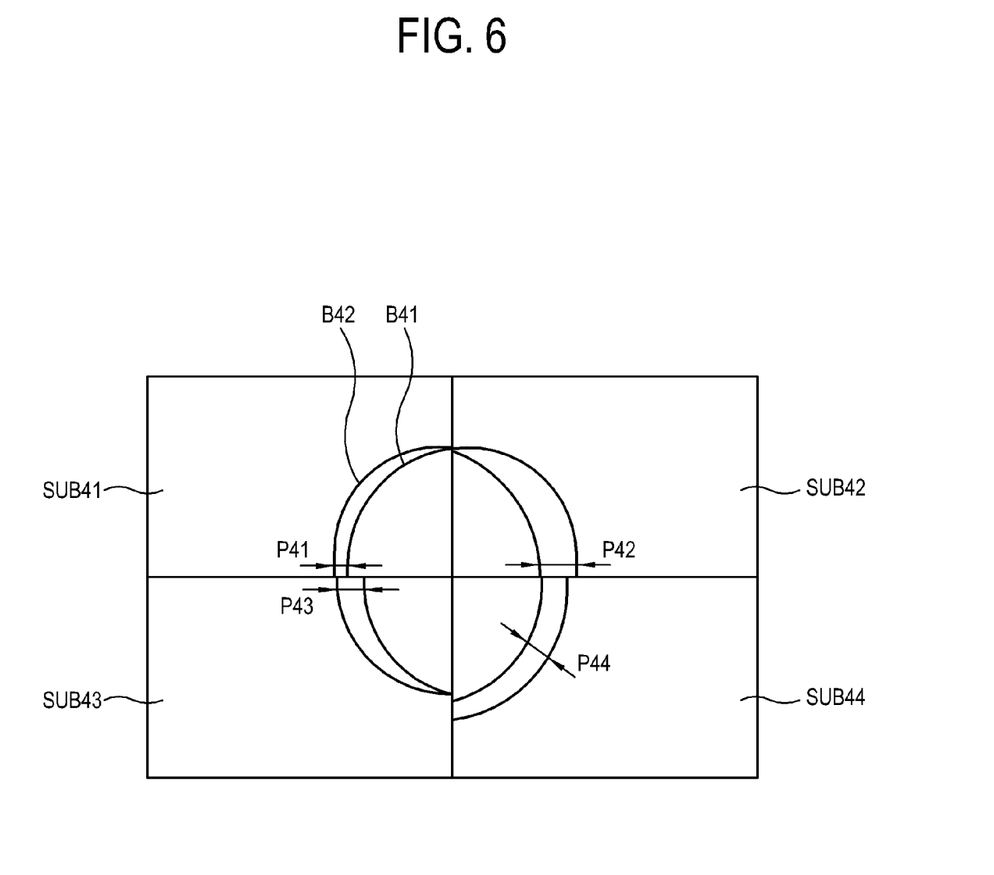
FIG. 6 is a view showing one sub-image divided by 4 display sub-regions in a display apparatus according an exemplary embodiment of the present invention.

FIG. 6 is a view showing an example of one sub image divided by 4 display sub-regions.

Referring to FIG. 6, reference images B41 and B42 for one sub-image corresponding to the left and right eye image fields are displayed on the entire display region and are divided into four individual sub-areas SUB41, SUB42, SUB43 and SUB44 in the 4 respective sub-regions.

The image processing unit 220 displays the sub-areas SUB41, SUB42, SUB43 and SUB44 by applying respective different 3D information values P41, P42, P43 and P44.

In this manner, a method where the image processing unit 220 displays a plurality of sub-images on respective display sub-regions may be modified in various ways.

Figure 7:
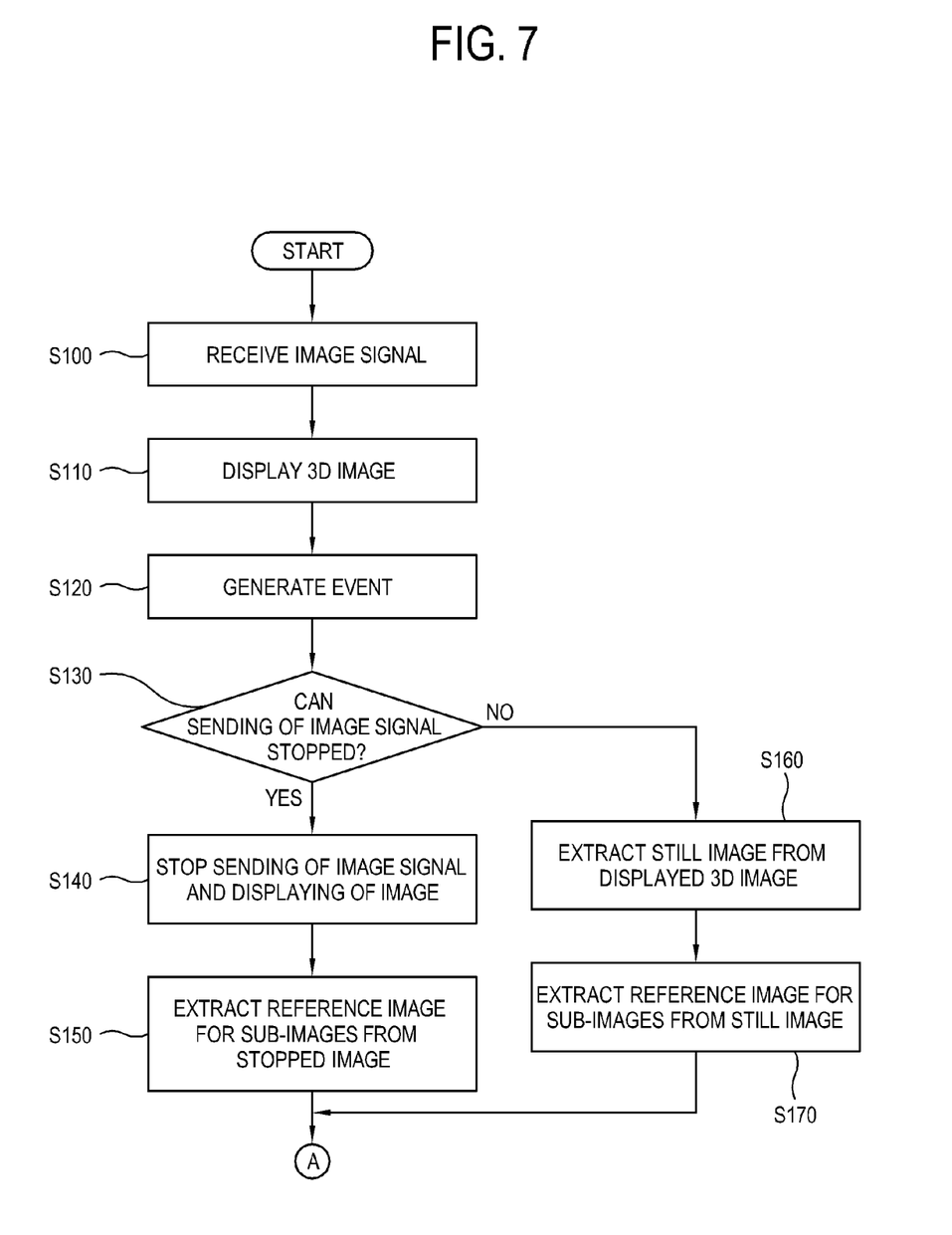
FIGS. 7 and 8 are flowcharts illustrating a control method according an exemplary embodiment of the present invention.
Figure 8:
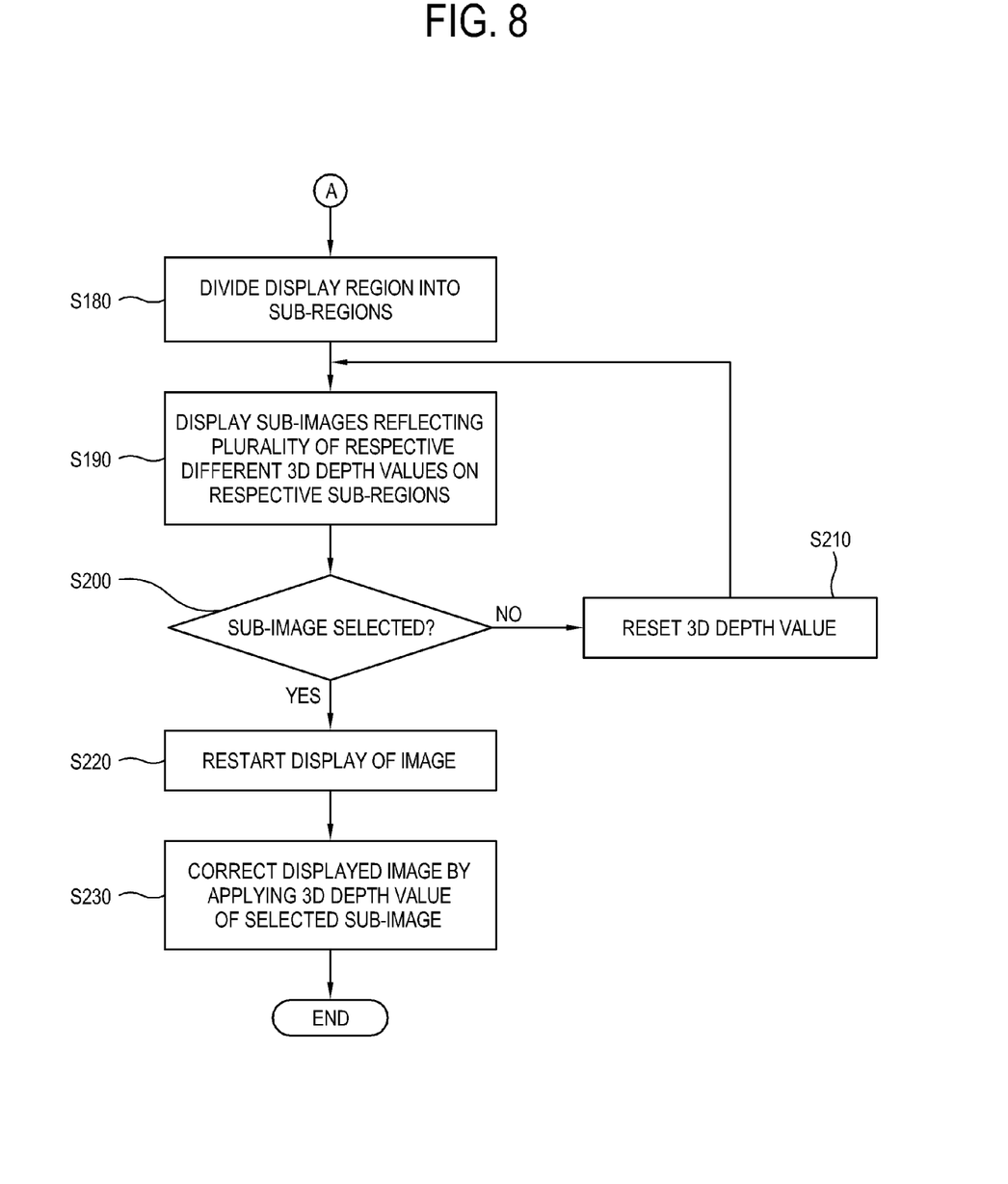

Hereinafter, a control method of the display apparatus 200 according to this exemplary embodiment will be described with reference to FIGS. 7 and 8. FIGS. 7 and 8 are flowcharts illustrating a control method of the display apparatus 100 of FIG. 1.

Referring to FIG. 7, upon receiving an image signal from the image source (S100), the image processing unit 220 processes the image signal and causes the display unit 230 to display a 3D image based on the processed image signal (S110).

When a preset event is generated through the user input unit 240 (S120), the image processing unit 220 checks whether or not sending of the image signal from the image source 100 can be stopped (S130).

If an affirmative result (YES) is determined in operation 5130, the image processing unit 220 transmits a preset control signal to the image source 100 to stop sending the image signal from the image source 100 and stop displaying of the 3D image displayed on the display unit 230 (S140). The image processing unit 220 extracts a reference image for sub-images from the stopped 3D image (S150).

On the other hand, if a negative result (NO) is determined in operation 5130, the image processing unit 220 extracts a still image of the displayed 3D image (S160) and extracts a reference image for sub-images from the extracted still image (S170).

Referring to FIG. 8, when the reference image for sub-images is extracted in this manner, the image processing unit 220 divides the display region into a preset number of sub-regions (S180). Then, the image processing unit 220 displays sub-images reflecting a plurality of 3D information values, for example, a plurality of values of 3D depth, on the respective sub-regions (S190).

The image processing unit 220 checks whether or not a sub-image is selected from the displayed sub-images (S200). If a reset event is generated instead of selection of a sub-image, the image processing unit 220 displays sub-images again by resetting 3D depth values (S210).

If affirmative result is determined (YES) in operation S200, the image processing unit restarts display of the 3D image (S220) and corrects the display 3D image by applying a 3D depth value of the selected sub-image (S230).

Through the above-described processes, the display apparatus 200 can display objects within a 3D image reflecting 3D information values desired by a user.

Although a few exemplary embodiments have been shown and described, it will be appreciated by those skilled in the art that changes may be made in these exemplary embodiments without departing from the principles and spirit of the invention.

What is claimed is:

1. A display apparatus comprising:
    a display unit;
    an image receiving unit which receives an image signal from an image source; and
    an image processing unit which processes the image signal, controls the display unit to display a three-dimensional (3D) image based on the processed image signal, controls the display unit to display a plurality of selectable sub-images which are respectively based on different preset 3D information values, and corrects the 3D image displayed on the display unit based on a 3D information value of a selected sub-image.

2. The display apparatus according to claim 1, wherein the 3D information value comprises a depth value of the 3D image.

3. The display apparatus according to claim 1, wherein the image processing unit extracts a reference image for the plurality of selectable sub-images from the 3D image.

4. The display apparatus according to claim 3, wherein the image processing unit controls the display unit to stop displaying the 3D image if sending of the image signal from the image source can be stopped, and extracts the reference image from the stopped 3D image.

5. The display apparatus according to claim 3, wherein the image processing unit extracts a still image from the 3D image if sending of the image signal from the image source cannot be stopped, and extracts the reference image from the extracted still image.

6. The display apparatus according to claim 1, wherein the plurality of selectable sub-images are provided separately from the image signal.

7. The display apparatus according to claim 1, wherein the image processing unit divides a region of the display into sub-regions and arranges the plurality of selectable sub-images respectively on the sub-regions.

8. The display apparatus according to claim 1, wherein the image processing unit arranges the plurality of selectable sub-images on a plurality of respective sub-areas in a region of the display and applies different 3D information values respectively to the respective sub-areas of the selected sub-image.

9. The display apparatus according to claim 1, further comprising a user input unit which is operable to control the image processing unit.

10. A method of controlling a display apparatus having a display unit, the method comprising:
   displaying on the display unit a three-dimensional (3D) image based on an image signal received from an image source;
   displaying on the display unit a plurality of selectable sub-images which are respectively based on different preset 3D information values; and
   correcting the displayed 3D image based on a 3D information value of a selected sub-image.

11. The method according to claim 10, wherein the 3D information value comprises a depth value of the 3D image.

12. The method according to claim 10, wherein the displaying of the plurality of selectable sub-images comprises extracting a reference image for the plurality of selectable sub-images from the 3D image.

13. The method according to claim 12, wherein the displaying of the plurality of selectable sub-images comprises stopping displaying of the 3D image if sending of the image signal from the image source can be stopped, and extracting the reference image from the stopped 3D image.

14. The method according to claim 12, wherein the displaying of the plurality of selectable sub-images comprises extracting a still image from the 3D image if sending of the image signal from the image source cannot be stopped, and extracting the reference image from the extracted still image.

15. The method according to claim 10, wherein the plurality of selectable sub-images are provided separately from the image signal.

16. The method according to claim 10, wherein the displaying of the plurality of selectable sub-images comprises dividing a region of the display unit into sub-regions and arranging the plurality of selectable sub-images on respective sub-regions.

17. The method according to claim 10, wherein the displaying of the plurality of selectable sub-images comprises arranging the plurality of selectable sub-images on a plurality of respective sub-areas in a region of the display unit and applying different 3D information values respectively to the respective sub-areas of the selected sub-image.

* * * * *